US008940459B2

(12) United States Patent
Nakanishi et al.

(10) Patent No.: US 8,940,459 B2
(45) Date of Patent: Jan. 27, 2015

(54) ALKALINE FUEL CELL ELECTRODE CATALYST, ALKALINE FUEL CELL, MANUFACTURE METHOD FOR ALKALINE FUEL CELL ELECTRODE CATALYST, AND MANUFACTURE METHOD FOR ALKALINE FUEL CELL (75) Inventors: Haruyuki Nakanishi, Susono (JP); Yusuke Kuzushima, Kyoto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 855 days.

(21) Appl. No.: 12/451,522

(22) PCT Filed: May 15, 2008

(86) PCT No.: PCT/IB2008/001207
§ 371 (c)(1),
(2), (4) Date: Nov. 17, 2009

(87) PCT Pub. No.: WO2008/142514
PCT Pub. Date: Nov. 27, 2008

(65) Prior Publication Data
US 2010/0196801 A1 Aug. 5, 2010

(30) Foreign Application Priority Data
May 18, 2007 (JP) .................................. 2007-133280

(51) Int. Cl.
*H01M 4/02* (2006.01)
*H01M 4/90* (2006.01)
*H01M 4/92* (2006.01)
*H01M 8/00* (2006.01)

(52) U.S. Cl.
USPC ........... 429/523; 429/405; 429/524; 429/526; 429/527; 429/535

(58) Field of Classification Search
None
See application file for complete search history.

(56) References Cited

U.S. PATENT DOCUMENTS

| 2004/0156771 | A1 | 8/2004 | Hoshino |
| 2006/0083970 | A1* | 4/2006 | Shibutani et al. ............... 429/30 |
| 2006/0099489 | A1 | 5/2006 | Kwak et al. |
| 2006/0116285 | A1 | 6/2006 | Cao et al. |
| 2007/0092768 | A1 | 4/2007 | Lee et al. |
| 2007/0092784 | A1 | 4/2007 | Dopp et al. |
| 2007/0104993 | A1* | 5/2007 | Lee et al. ........................ 429/33 |
| 2007/0227300 | A1 | 10/2007 | McGrath et al. |

FOREIGN PATENT DOCUMENTS

| CN | 1733396 A | 2/2006 |
| CN | 1803292 A | 7/2006 |
| CN | 1909275 A | 2/2007 |

(Continued)

OTHER PUBLICATIONS

Office Action dated Mar. 26, 2012 in Chinese Application No. 200880016569.X (with translation).
International Search Report issued in International Application No. PCT/IB2008/001207; Mailed on Oct. 7, 2008.
International Preliminary Report on Patentability issued in International Application No. PCT/IB2008/001207; Mailed on Aug. 27, 2009.

(Continued)

*Primary Examiner* — Sarah A Slifka
(74) *Attorney, Agent, or Firm* — Oliff PLC (57) ABSTRACT

An alkaline fuel cell electrode catalyst includes a first catalyst particle that contains at least one of iron (Fe), cobalt (Co) and nickel (Ni), a second catalyst particle that contains at least one of platinum (Pt) and ruthenium (Ru), and a carrier for supporting the first catalyst particle and the second catalyst particle.

17 Claims, 3 Drawing Sheets

(56) References Cited

FOREIGN PATENT DOCUMENTS

| EP | 1 612 874 A1 | 1/2006 |
| EP | 1 641 062 A1 | 3/2006 |
| JP | B2-3360485 | 12/2002 |
| WO | WO 2004/047204 A1 | 6/2004 |
| WO | WO 2004/102704 A1 | 11/2004 |
| WO | WO 2006/074829 A1 | 7/2006 |
| WO | WO 2006/080702 A1 | 8/2006 |

OTHER PUBLICATIONS

Chinese Office Action used in Application No. 200880016569.X; Dated Sep. 15, 2011 (With Translation).

Notification of Reason(s) for Refusal dated Jul. 24, 2012 from Japanese Patent Application No. 2007-133280 (with partial English-language translation).

Maruzen Co., Ltd., "Battery Handbook," 1995, pp. 387-392.

* cited by examiner

ALKALINE FUEL CELL ELECTRODE CATALYST, ALKALINE FUEL CELL, MANUFACTURE METHOD FOR ALKALINE FUEL CELL ELECTRODE CATALYST, AND MANUFACTURE METHOD FOR ALKALINE FUEL CELL

CROSS-REFERENCE TO RELATED APPLICATIONS

This application is a national phase application of International Application No. PCT/IB2008/001207, filed May 15, 2008, and claims priority to Japanese Application No. 2007-133280, filed May 18, 2007, the contents of both are incorporated herein by reference.

BACKGROUND OF THE INVENTION

1. Field of the Invention

The invention relates to an alkaline fuel cell electrode catalyst and an alkaline fuel cell that employs the electrode catalyst as well as manufacture methods for the alkaline fuel cell electrode catalyst and the alkaline fuel cell.

2. Description of the Related Art

Japanese Patent No. 3360485 discloses a fuel cell that uses a reformed gas from methane or methanol as a fuel. In the fuel cell of Japanese Patent No. 3360485, the anode electrode (fuel electrode) has a function of producing pure hydrogen from methane or methanol supplied as a fuel. Concretely, this anode electrode is constructed of three layers, that is, a catalyst inner layer in contact with an electrolyte membrane, a porous base material disposed on an outer side of the catalyst inner layer, and a catalyst outer layer disposed on the outer side of the porous base material. A platinum catalyst is used in the catalyst inner layer and the catalyst outer layer.

According to Japanese Patent No. 3360485, when the anode electrode of a fuel cell is supplied with a fuel such as methane or the like, hydrogen in the fuel is extracted and separated into protons and electrons mainly due to the action of catalyst particles in the catalyst outer layer, and the electrons are received again on other catalyst particles so as to form a hydrogen gas. The carbon monoxide (CO) produced at this time is adsorbed and retained to catalyst particles in the catalyst outer layer. The hydrogen gas produced in the catalyst outer layer of the anode electrode passes through the porous base material to reach the catalyst inner layer. The hydrogen gas is separated again into electrons and protons by the action of the catalyst particles in the catalyst inner layer, and the protons pass through the electrolyte membrane to reach the cathode electrode (oxygen electrode).

That is, according to Japanese Patent No. 3360485, pure hydrogen is produced in the catalyst outer layer of the anode electrode, and CO or the like also produced at the same time directly becomes adsorbed in the catalyst outer layer. Therefore, only pure hydrogen moves into the porous base material so that the interior of the porous base material is filled with pure hydrogen. As a result, only the pure hydrogen diffuses in the catalyst inner layer. Thus, even in the case where a fuel containing carbon, such as methane, methanol, etc., is used, the adverse effects of CO on the catalyst inner layer are restrained and the functions of the anode electrode are secured.

In order to improve the power generation performance of fuel cells, development of an electrode catalyst that has high catalytic activity is desired. Besides, particularly in the case where a fuel other than pure hydrogen, such as alcohol or the like, is used, it is important to efficiently extract hydrogen by decomposing the fuel and therefore improve the utilization rate of the fuel.

In this respect, Japanese Patent No. 3360485 provides a technology, for the case where methane or methanol is used as a fuel, which produces pure hydrogen from methane or the like and supplies the pure hydrogen to the catalyst inner layer so as to restrain the adverse effects of CO on the anode electrode of the catalyst inner layer. However, Japanese Patent No. 3360485 does not concern achieving high efficiency in the extraction of hydrogen from methane or methanol as a fuel. In the case where, as in Japanese Patent No. 3360485, hydrogen gas is produced from methane or the like in the catalyst outer layer, and is supplied to the catalyst inner layer, and protons are produced from the hydrogen gas in the catalyst inner layer, two stages of catalytic reaction in the catalyst outer layer and the catalyst inner layer are undergone. Therefore, it is considered that the catalytic reaction rate of the anode electrode will decline and the power generation performance of the fuel cell will be lowered.

Incidentally, the fuel cell disclosed in Japanese Patent No. 3360485 employs a proton exchange membrane as an electrolyte membrane, so that the power generation reaction is conducted in an acidic environment. In contrast, the alkaline fuel cell employs an electrolyte membrane that allows permeation of anions therethrough, so that the power generation reaction is conducted in an alkaline environment. Therefore, in the alkaline fuel cell, a metal that tends to degrade in an acidic environment may be used as an electrode catalyst. Hence, since the metal used as an electrode catalyst may be selected from a wide variety of choices, an electrode catalyst that has high catalytic activity while achieving a cost reduction of the electrode catalyst by using a metal other than platinum (Pt) is expected to be developed. Besides, heightened catalytic activity of the electrode will make it possible to achieve high output of the fuel cell even if a fuel other than pure hydrogen is supplied directly to the electrode catalyst. Thus, an electrode catalyst may efficiently extract hydrogen by decomposing the supplied fuel and thus improve the fuel utilization rate so as to further improve the power generation performance of the alkaline fuel cell while expanding the range of choices of the fuel of the fuel cell is desired to be developed.

SUMMARY OF THE INVENTION

The invention provides an alkaline fuel cell electrode catalyst that is improved so as to heighten the catalyst function of the electrode catalyst of an alkaline fuel cell, and a manufacture method for the alkaline fuel cell electrode catalyst as well as an alkaline fuel cell that employs this electrode catalyst, and a manufacture method for the alkaline fuel cell.

An alkaline fuel cell electrode catalyst in accordance with a first aspect of the invention includes: a first catalyst particle containing at least one of iron, cobalt and nickel; a second catalyst particle containing at least one of platinum and ruthenium; and a carrier on which at least one of the first catalyst particle and the second catalyst particle are supported.

In the alkaline fuel cell electrode catalyst in accordance with the first aspect, the first catalyst particle may include iron, cobalt and nickel.

In the alkaline fuel cell electrode catalyst in accordance with the first aspect, the second catalyst particle may include platinum and ruthenium.

In the alkaline fuel cell electrode catalyst in accordance with the first aspect, both the first catalyst particle and the second catalyst particle may be supported on a single carrier.

Both the first catalyst particle and the second catalyst particle may also be supported on each carrier in the catalyst layer.

The alkaline fuel cell electrode catalyst in accordance with the first aspect may further include a catalyst layer in which a plurality of carriers are provided, wherein a first carrier on which at least the first catalyst particle is supported and a second carrier on which at least the second catalyst particle is supported are provided in the catalyst layer.

In the alkaline fuel cell electrode catalyst in accordance with the first aspect, a ratio of iron, cobalt and nickel contained in the first catalyst particle may be 1:1:1.

In the alkaline fuel cell electrode catalyst in accordance with the first aspect, a proportion of iron, cobalt and nickel contained in the first catalyst particle may be such that a proportion of each of iron, cobalt and nickel contained in the first catalyst particle is in a range of 30% to 40% relative to a total amount of the elements.

In the alkaline fuel cell electrode catalyst in accordance with the first aspect, a ratio of platinum and ruthenium contained in the second catalyst particle may be 1:1.

In the alkaline fuel cell electrode catalyst in accordance with the first aspect, a ratio of platinum and ruthenium contained in the second catalyst particle may be in a range of 2:3 to 3:2.

In the alkaline fuel cell electrode catalyst in accordance with the first aspect, a ratio of the first catalyst particle and the second catalyst particle supported on the carrier may be in a range of 1:2 to 2:1.

In the alkaline fuel cell electrode catalyst in accordance with the first aspect, the carrier may be a carbon powder carrier.

An alkaline fuel cell in accordance with a second aspect of the invention includes: an electrolyte membrane that allows negative ions to pass through the electrolyte membrane; and a pair of electrodes disposed on both sides of the electrolyte membrane, wherein at least one electrode of the pair of electrodes includes the alkaline fuel cell electrode catalyst in accordance with the first aspect.

In the alkaline fuel cell in accordance with the second aspect, the at least one electrode may be an anode electrode; and the alkaline fuel cell may further include a fuel supply system that supplies a fuel having a C—C bond to the anode electrode.

A manufacture method for an alkaline fuel cell electrode catalyst in accordance with a third aspect of the invention includes: preparing a mixed solution by mixing a first solution that contains iron ions, cobalt ions and nickel ions, and a second solution that contains ruthenium ions and platinum ions; mixing a carrier particle into the mixed solution; vacuum-degassing the mixed solution in which the carrier particle has been mixed; separating the carrier particle from the vacuum-degassed mixed solution; and performing a heat treatment on the carrier particle.

In the manufacture method for an alkaline fuel cell electrode catalyst in accordance with the third aspect, the heat treatment of the carrier particle may be performed in a vacuum atmosphere.

In the manufacture method for an alkaline fuel cell electrode catalyst in accordance with the third aspect, a ratio of the iron ions, the cobalt ions and the nickel ions contained in the first solution may be 1:1:1.

In the manufacture method for an alkaline fuel cell electrode catalyst in accordance with the third aspect, a ratio of the ruthenium ions and the platinum ions contained in the second solution may be 1:1.

In the manufacture method for an alkaline fuel cell electrode catalyst in accordance with the third aspect, a ratio of the first solution and the second solution that are mixed to prepare the mixed solution may be in a range of 2:1 to 1:2.

In the manufacture method for an alkaline fuel cell electrode catalyst in accordance with the third aspect, each of a concentration of the iron ions in the first solution, a concentration of the cobalt ions in the first solution and a concentration of the nickel ions in the first solution may be in a range of 0.005 [mol/l] to 10 [mol/l].

In the manufacture method for an alkaline fuel cell electrode catalyst in accordance with the third aspect, each of a concentration of the ruthenium ions in the second solution, and a concentration of the platinum ions in the second solution may be in a range of 0.005 [mol/l] to 10 [mol/l].

In the manufacture method for an alkaline fuel cell electrode catalyst in accordance with the third aspect, a mixed amount of the carrier particle in may be in a range of 25 [g] to 100 [g] per liter of the mixed solution prepared by mixing the first solution and the second solution.

A manufacture method for an alkaline fuel cell in accordance with a fourth aspect of the invention includes: preparing an electrode catalyst solution by mixing an electrode catalyst for a fuel cell into an electrolyte solution in which an electrolyte membrane that allows permeation of negative ions through the electrolyte membrane has been dissolved; and applying the electrode catalyst solution to at least one surface side of the electrolyte membrane that allows permeation of the negative ions, wherein the electrode catalyst is manufactured by the manufacture method described in accordance with the third aspect.

According to the first aspect of the invention, the alkaline fuel cell electrode catalyst includes the first catalyst particle that includes iron, cobalt and nickel, the second catalyst particle that includes platinum and ruthenium. Therefore, the catalytic activity of the fuel cell may be improved so as to achieve high output of the fuel cell, and the usage rate of Pt in the electrode catalyst may be reduced so as to achieve a cost reduction of the electrode catalyst.

According to the second aspect of the invention, the alkaline fuel cell has the electrode catalyst in accordance with the first aspect. Therefore, the catalyst function of the alkaline fuel cell may be improved, and the power generation performance may be improved.

As described above, since the electrode catalyst of the invention includes the first catalyst particle and the second catalyst particle, the electrode catalyst may effectively break C—C bonds in the fuel and utilize the fuel at high efficiency. Therefore, if the invention is applied to a fuel cell that has a fuel supply system that supplies a fuel that has C—C bonds, the function of the electrode catalyst of the invention may be more effectively performed.

Furthermore, according to the third aspect of the invention, the electrode catalyst for an alkaline fuel cell is manufactured by mixing carrier particles into the mixed solution obtained by mixing the first solution that contains iron ions, cobalt ions and nickel ions and the second solution that contains ruthenium ions and platinum ions, and then performing a predetermined heat treatment and the like. As a result, Fe—Co—Ni particles and Pt—Ru particles may be reliably supported on carrier particles of an electrode catalyst, and an electrode catalyst whose catalytic activity is high may be manufactured at relatively low cost.

According to the fourth aspect of the invention, an electrode catalyst for a fuel cell is manufactured by the manufacture method in accordance with the third aspect.

Therefore, an alkaline fuel cell that is high in catalytic activity and also high in power generation performance may be obtained.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF EMBODIMENTS

Hereinafter, embodiments of the invention will be described with reference to the drawings. In addition, the same or corresponding portions are assigned with the same reference numerals, and the description thereof will be simplified or omitted.

Figure 1:
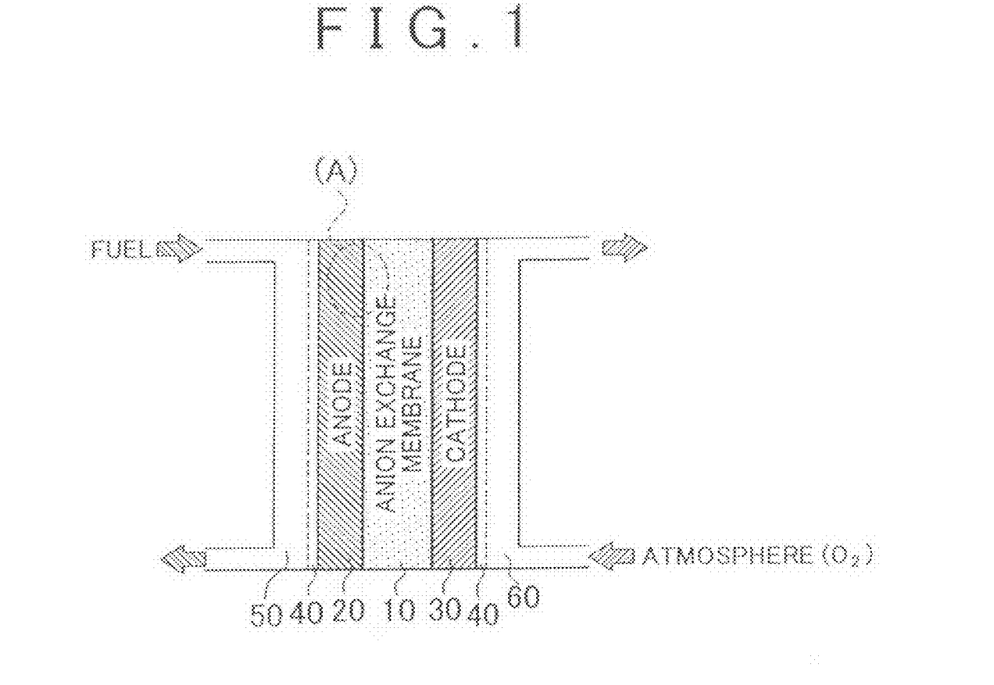
FIG. 1 is a diagram for describing a fuel cell in an embodiment of the invention.

FIG. 1 is a drawing for describing a construction of a fuel cell of an embodiment of the invention. The fuel cell shown in FIG. 1 is an alkaline fuel cell. The fuel cell has an anion exchange membrane 10 (electrolyte membrane). On both sides of the anion exchange membrane 10, an anode electrode 20 and a cathode electrode 30 are disposed as a pair of electrodes. A current collecting plate 40 is disposed on an outer side of each of the anode electrode 20 and the cathode electrode 30. A fuel path 50 is connected to one surface side of the current collecting plate 40 on the anode electrode 20 side, and a fuel supply source (not shown) is connected to the fuel path 50. A fuel is supplied from the fuel supply source to the anode electrode 20 via the fuel path 50 and the current collecting plate 40, so that unreacted fuel or the like is discharged from the anode electrode 20. On the other hand, an oxygen path 60 is connected to another surface side of the current collecting plate 40 on the cathode electrode 30 side. Via the oxygen path 60 and the current collecting plate 40, atmosphere is supplied to the cathode electrode 30, so that an atmosphere off-gas that contains unreacted oxygen is discharged from the cathode electrode 30.

At the time of power generation of the fuel cell, the anode electrode 20 is supplied with a fuel that has C—C bonds and hydrogen, for example, ethanol or the like. On the other hand, the cathode electrode 30 is supplied with the atmosphere (or oxygen). As the fuel is supplied to the anode electrode 20, the fuel is decomposed to produce hydrogen due to the function of the electrode catalyst of the anode electrode 20. The oxygen reacts with hydroxide ions that pass through the anion exchange membrane 10 from the cathode electrode 30 side to the anode electrode 20 side, so that water is produced and electrons are released. The reaction at the anode electrode 20 proceeds as in the following equation (1) in the case where the fuel is pure hydrogen or the following equation (2) in the case where the fuel is ethanol.

(1)

(2)

On the other hand, as the atmosphere is supplied to the cathode electrode 30, the oxygen molecules in the atmosphere receive electrons from the cathode electrode 30 to produce hydroxide ions through several stages, due to the function of the electrode catalyst of the cathode electrode 30. The hydroxide ions move to the anode electrode 20 side through the anion exchange membrane 10. The reaction at the cathode electrode 30 proceeds as in the following equation (3):

(3)

The combination of the reactions at the anode electrode 20 side and the cathode electrode 30 side described above shows that the water-producing reaction represented by the following equation (4) occurs in the fuel cell as a whole, and the electrons involved in the reaction move via the current collecting plates 40 on the two electrode sides.

(4)

In the alkaline-type fuel cell as described above, the anion exchange membrane 10 is not particularly limited as long as it is a medium capable of moving the hydroxide ions ($OH^-$) produced by the electrode catalyst of the cathode electrode 30 to the anode electrode 20. Concretely, examples of the anion exchange membrane 10 include solid polymer membranes (anion exchange resin) that have anion exchange groups such as primary to tertiary amino groups, quaternary ammonium groups, pyridyl groups, imidazole groups, quaternary pyridium groups, quaternary imidazolium groups, etc. Besides, examples of the solid polymer membrane include membranes of hydrocarbon-based resins, fluorine-based resins, etc. The use of such an anion exchange membrane makes it possible to restrain the adverse effects of CO on the membrane even in the case where the atmosphere or an organic compound-based fuel is used as a reactant.

The anode electrode 20 and the cathode electrode 30 have the same structure. Concretely, the two electrodes each have at least a catalyst. The catalyst of each electrode is formed by mixing electrode catalyst particles that are carrier particles supporting catalyst particles as described below, in an electrolyte solution obtained by dissolving substantially the same components as those of the anion exchange membrane 10, and then applying the mixture to the anion exchange membrane 10.

Incidentally, the electrode catalyst of the anode electrode 20 has the catalyst function of causing hydrogen atoms in the supplied fuel and hydroxide ions having passed through the anion exchange membrane 10 to react so as to produce water ($H_2O$) and, at the same time, release electrons ($e^-$) to the current collecting plate 40, as shown in the foregoing equation (1). On the other hand, the electrode catalyst of the cathode electrode 30 has the catalytic function of receiving electrons ($e^-$) from the current collecting plate 40 and producing hydroxide ions from the electrons, oxygen ($O_2$) and water ($H_2O$), as shown in the foregoing equation (3).

In order to improve the power generation performance of the fuel cell, it is important to cause the production of hydroxide ions ($OH^-$) from oxygen as in the equation (3) to efficiently proceed at the cathode electrode 30 and cause the extraction of hydrogen from the fuel and the catalytic reaction as in the equation (1) to efficiently proceed at the anode electrode 20. Particularly in the case where a fuel other than pure hydrogen, for example, alcohol or the like, is supplied, it is important to efficiently obtain hydrogen from the fuel so as to improve the fuel utilization efficiency.

Figure 2:
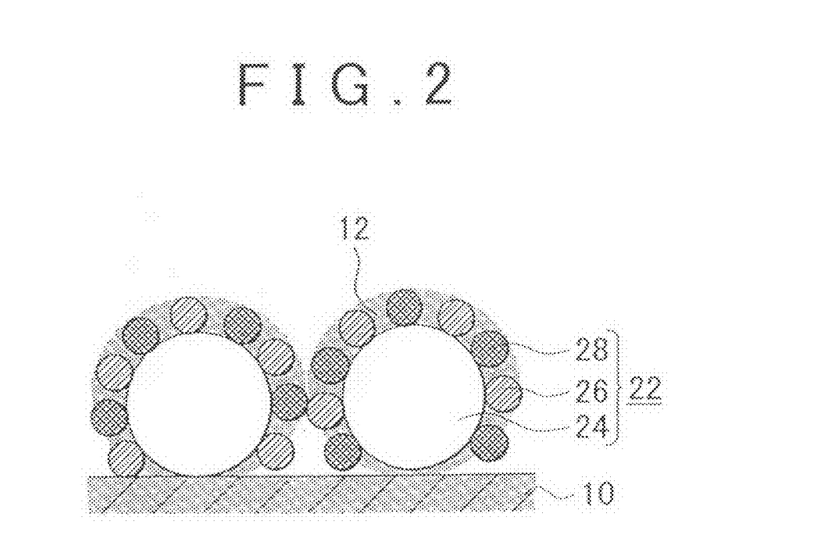
FIG. 2 is a diagram for describing an electrode catalyst of the fuel cell in the embodiment of the invention.

FIG. 2 is an enlarged view of a portion of the anode electrode 20 that is enclosed by a dotted line (A) in FIG. 1. While FIG. 2 shows an enlarged illustration of the catalyst of the anode electrode 20, it is to be noted that the catalyst of the cathode electrode 30 also has substantially the same construction as mentioned above. As shown in FIG. 2, the catalyst of the anode electrode 20 is formed by mixing electrode catalyst particles 22 in an electrolyte solution 12 obtained by dissolving substantially the same components as those of the anion exchange membrane 10, and then applying the mixture to the anion exchange membrane 10.

The electrode catalyst particles 22 are carriers on which catalyst particles are supported. The carriers of the electrode catalyst particles 22 are constructed of carbon powder 24. The carbon powder 24 is composed of particles of 30 nm to 100 nm in particle size. The carbon powder 24 supports thereon a plurality of particles 26 (first catalyst particles) made up of iron, cobalt and nickel (Fe—Co—Ni), and a plurality of particles 28 (second catalyst particles) made up of platinum and ruthenium (Pt—Ru).

The ratio of the elements in the Fe—Co—Ni particle 26, that is, iron (Fe), cobalt (Co) and nickel (Ni), is 1:1:1. The ratio of the elements in the Pt—Ru particle 28, that is, platinum (Pt) and ruthenium (Ru), is 1:1. Furthermore, the proportion between the Fe—Co—Ni particles 26 and the Pt—Ru particles 28 supported on the carbon powder 24 is within the range of 1:2 to 2:1 in the average for all the electrode catalyst particles 22 in the catalyst.

As for the anode electrode 20, it has been found that, due to the use of the electrode catalyst particles 22 supporting two kinds of catalyst particles, that is, the Fe—Co—Ni particles 26 and the Pt—Ru particles 28, high catalytic activity of the anode electrode 20 may be secured and high-efficient utilization of the supplied fuel, such as ethanol or the like, may be secured. A reason for this is considered to be that the Fe—Co—Ni particles 26 have a function of breaking C—C bonds in the fuel supplied to the anode electrode 20, such as ethanol or the like, and, on the other hand, the Pt—Ru catalyst particles 28 has high catalytic activity, and therefore that when the C—C bonds are efficiently broken mainly by the Fe—Co—Ni particles 26, more hydrogen is taken up mainly by the Pt—Ru particles 28, so that the reaction between hydrogen and hydroxide ions is accelerated.

That is, the breakage of C—C bonds due to Fe—Co—Ni particles 26 is efficiently accelerating, and thereby hydrogen is separated from an organic matter, which leads in the improvement of utilization of hydrogen in the fuel. Besides, by separating and producing a large amount of hydrogen in this manner, the catalytic reaction on the Pt—Ru particles 28 having high catalytic activity may be further accelerated. Therefore, by supporting both the Fe—Co—Ni particles 26 and the Pt—Ru particles 28 on the carbon powder 24, an electrode catalyst with high catalytic activity may be obtained. It is to be noted herein that since the proportion of Fe, Co and Ni in the first catalyst particle is 1:1:1, an electrode catalyst may be obtained which efficiently extracts hydrogen from the supplied fuel even in the case where the fuel is an organic fuel having C—C bonds, by efficiently breaking the C—C bonds, and thus improves the fuel utilization rate of the fuel cell. Besides, since the proportion of Pt and Ru in the second catalyst particle is 1:1, high catalytic activity of the electrode catalyst may be maintained. Besides, since the proportion between the first catalyst particles and the second catalyst particles supported on a carrier is within the range of 1:2 to 2:1, an electrode catalyst may be obtained which maintains high catalytic activity of the electrode catalyst so as to improve the power generation performance of the fuel cell and heighten the fuel utilization rate even in the case where a fuel having C—C bonds is supplied.

Besides, since platinum (Pt) is expensive while its catalytic activity is high, an expensive electrode catalyst results if the catalyst particle is constructed only of platinum (Pt). In this respect, the use of the Fe—Co—Ni particles 26 and the ruthenium (Ru) together with platinum (Pt) decreases the proportion of platinum (Pt) in the electrode catalyst particles 22. This may reduce the costs of the electrode catalyst and therefore of the fuel cell. Furthermore, platinum (Pt) tends to react with CO and thus corrode in an atmosphere containing CO. However, the proportion of platinum (Pt) in the entire electrode catalyst particles 22 may be reduced by using the Fe—Co—Ni particles 26 and the Pt—Ru particles 28 to form the electrode catalyst particles 22. Therefore, the corrosion of the electrode catalyst particle may be restrained to a low level and the durability of the electrodes of the fuel cell may be maintained at a high level.

Figure 3:
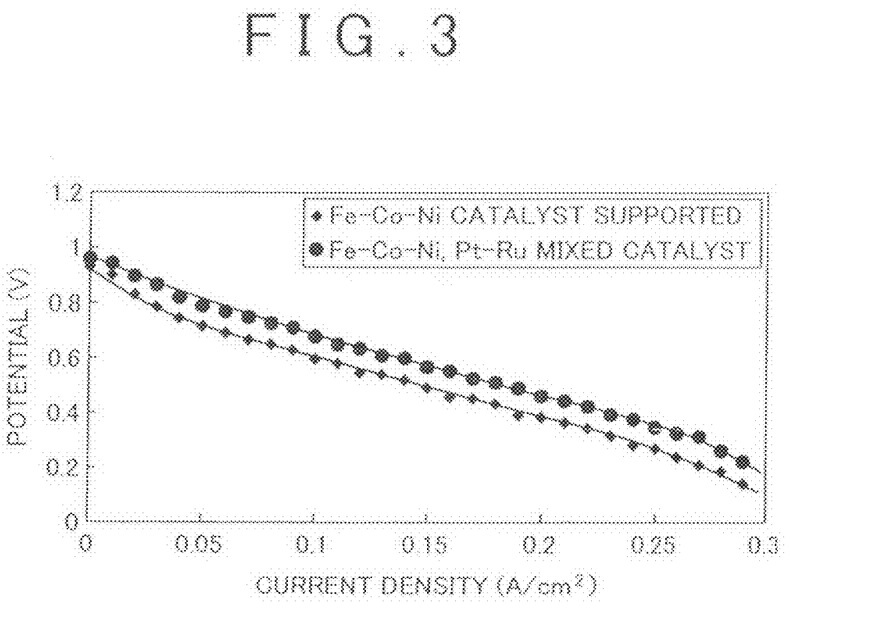
FIG. 3 is a diagram for describing a characteristic of the fuel cell of the embodiment of the invention.

FIG. 3 is a diagram that compares the I-V characteristics of cells that were made by using catalyst layers in which the Fe—Co—Ni catalyst was supported on the carbon powder carrier and of cells that were made by using catalyst layers in which a combined catalyst of Fe—Co—Ni and Pt—Ru was supported on the carbon powder carrier. In FIG. 3, the horizontal axis represents the current density [$A/cm^2$], and the vertical axis represents voltage [V]. In FIG. 3, the curve plotted with solid circles represents the I-V characteristic of a fuel cell in accordance with an embodiment of the invention, that is, a fuel cell in which the electrode catalyst particles 22 had the Fe—Co—Ni particles 26 and the Pt—Ru particles 28. On the other hand, the curve plotted with squares represents the I-V characteristic of a fuel cell in which the electrode catalyst particles had only the Fe—Co—Ni particles. From FIG. 3, it may be understood that if the electrode catalyst particles supporting the Fe—Co—Ni particles 26 and the Pt—Ru particles 28 as catalyst particles is used, high power generation performance may be achieved at least in the range of current density of 0 to 0.3 [$A/cm^2$].

Figure 4:
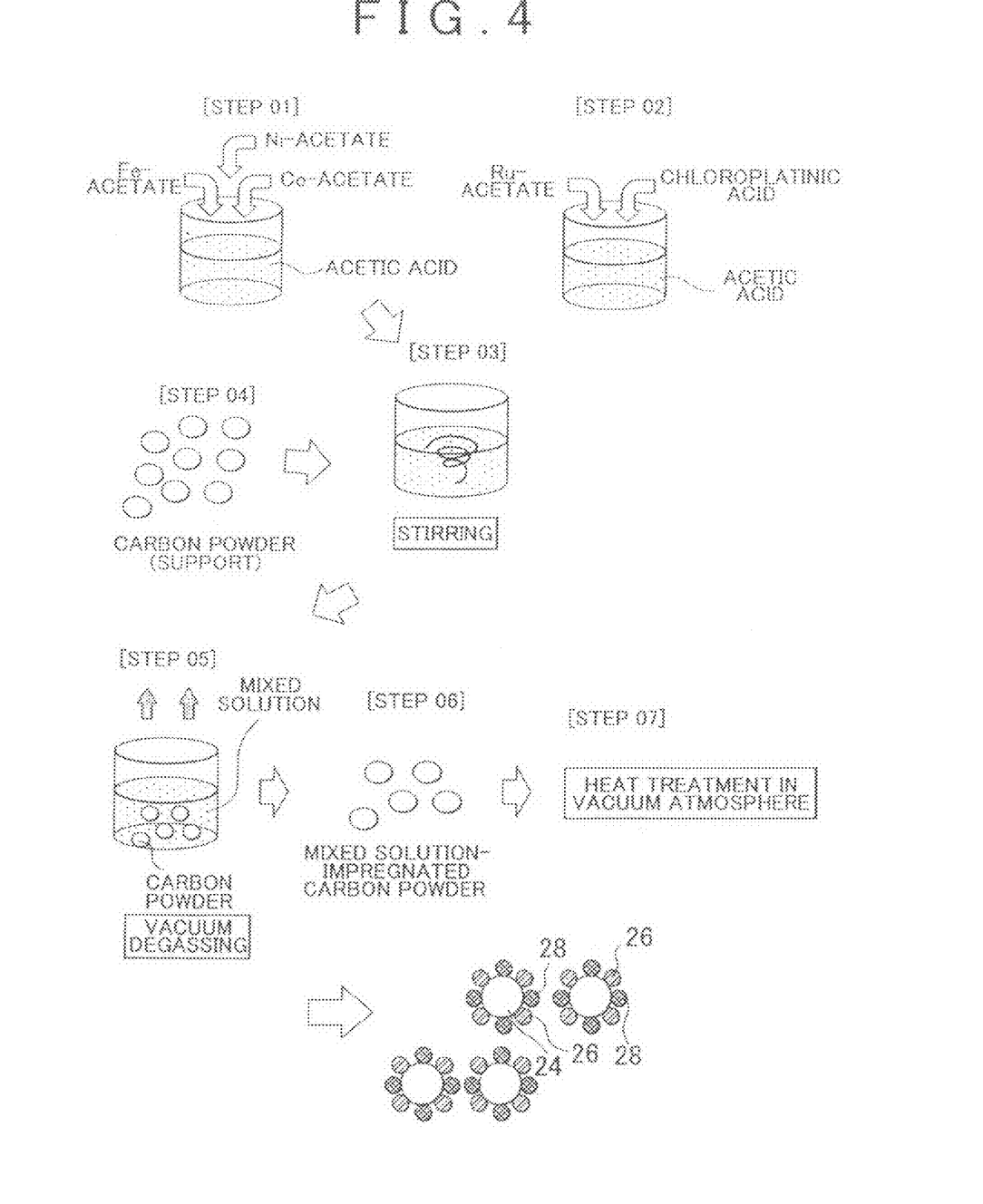
FIG. 4 is a diagram for describing a method of making the electrode catalyst of the embodiment of the invention.

FIG. 4 is a schematic diagram for describing a manufacture method for the electrode catalyst particles 22 in the embodiment of the invention. Hereinafter, with reference to FIG. 4, the manufacture method for the electrode catalyst particles 22 will be described. In step 01 in FIG. 4, firstly a first solution is prepared by mixing Fe-acetate, Co-acetate and Ni-acetate at equimolar ratio (1:1:1) into acetic acid. It is to be noted herein that each of the concentrations of Fe-acetate, Co-acetate and Ni-acetate is within the range of 0.005 [mol/l] to 10 [mol/l]. Similarly, in step 02, a second solution is prepared by mixing Ru-acetate and chloroplatinic acid at equimolar ratio (1:1) into acetic acid. It is to be noted herein that the concentration of Ru-acetate and the concentration of chloroplatinic acid are both within the range of 0.005 [mol/l] to 10 [mol/l].

Next, the first solution and the second solution are mixed and stirred (step 03). The mixing ratio between the first solution and the second solution herein is within the range of 1:2 to 2:1. Next, the carbon powder 24, which is a carrier, is put into the stirred mixed solution (step 04). The amount of carbon powder 24 mixed in is set within the range of 25 [g] to 100 [g] per liter of the mixed solution.

Next, the mixed solution is vacuum-degassed (step 05). This allows relatively large amounts of Fe—Co—Ni particles 26 and Pt—Ru particles 28 in the mixed solution to adsorb to the carbon powder 24. Next, the carbon powder 24 in the mixed solution is separated by filtration or the like (step 06). The thus-separated carbon powder 24 is in a state in which the Fe—Co—Ni particles 26 and the Pt—Ru particles 28 are adsorbed to the carbon powder 24.

Next, the separated carbon powder 24 is heated in a vacuum (step 07). The temperature of the heat treatment is set within 800[° C.] to 1000[° C.]. In this manner, electrode catalyst particles 22 in which the Fe—Co—Ni particles 26 and the Pt—Ru particles 28 are fixed and supported on the carbon powder 24 are manufactured.

After that, the thus-manufactured electrode catalyst particles 22 are mixed into an electrolyte solution obtained by dissolving the same components as those of the anion exchange membrane 10, and the mixture is applied to the both sides of the anion exchange membrane 10, so that the anode electrode 20 and the cathode electrode 30 are formed on the both sides of the anion exchange membrane 10. After that, the current collecting plates 40 and one of the paths (50, 60) of the reactant gases are formed on the both sides of an assembly of the anion exchange membrane 10 and the pair of electrodes (the anode electrode 20 and the cathode electrode 30). Thus, the fuel cell shown in FIG. 1 is manufactured.

The foregoing embodiment of the invention is described in conjunction with an alkaline fuel cell in which a pair of electrodes (the anode electrode 20 and the cathode electrode 30) are disposed on the both sides of the anion exchange membrane 10, and the current collecting plates 40 and one of the reactant gas paths 50, 60 are disposed on the both sides of the pair of electrodes. However, in this invention, the alkaline fuel cell is not limited so. For example, the alkaline fuel cell may also be a fuel cell in which a diffusion layer is disposed on a surface of a catalyst layer in each of the anode electrode 20 and the cathode electrode 30. Besides, the alkaline fuel cell may also be an alkaline fuel cell that has a stack structure in which membrane-electrode assemblies each including an anion exchange membrane 10 and a pair of electrodes 20, 30 are connected in series via separators each of which includes a current collecting plate, instead of the fuel cell made up of only one set of the anion exchange membrane 10 and the two electrodes 20, 30. In this case, a diffusion layer or the like may also be disposed on a surface of each of the electrodes 20, 30.

Besides, the embodiment of the invention is described above in conjunction with the electrode catalyst particles 22 that support the Fe—Co—Ni particles 26 and the Pt—Ru particles 28 at an average ratio in the range of 2:1 to 2:1. However, in this invention, the ratio between the two particles 26, 28 is not limited so, but may also be in a different range. The electrode catalyst particles 22 may also support the two kinds of particles 26, 28 at different ratios. It suffices that in view of the electrode catalyst particles 22 in the catalyst layer as a whole, the Fe—Co—Ni particles 26 and the Pt—Ru particles 28 be supported on some of the carriers (carbon powder 24). However, since the Fe—Co—Ni particles 26 and the Pt—Ru particles 28 are considered to have different functions, it is considered that the catalyst function will further improve if the two kinds of particles 26, 28 are supported at relatively close positions, for example, on the same carriers. Therefore, each particle of the carbon powder 24 may support at least one kind of particle of the Fe—Co—Ni particles 26 and the Pt—Ru particles 28.

The embodiment is described above in conjunction with the case where the Fe—Co—Ni particles 26 contain Fe, Co and Ni at the same molar ratio. However, this invention is not limited so. For example, these elements may be contained at the same molar ratio in the average for all the Fe—Co—Ni particles 26 in the catalyst. However, this is not restrictive, but the elements may also be contained at other proportions. In such a case, too, the Fe—Co—Ni particles 26 may contain each of the elements at an average proportion in the range of 30% to 40%.

Similarly, the embodiment is described above in conjunction with the case where the Pt—Ru particles 28 contain Pt and Ru at the same molar ratio. However, this invention is not limited to this ratio. For example, these elements may be contained at the same molar ratio in the average for all the Pt—Ru particles 28 in the catalyst. However, this is not restrictive, but the elements may also be contained at other proportions. In such a case, too, the Pt—Ru particles 28 may contain each of the elements at an average proportion in the range of 40% to 60%.

Incidentally, the proportion of iron (Fe), cobalt (Co) and nickel (Ni) in the first solution in the manufacture method for the electrode catalyst particles 22, the proportion of platinum (Pt) and ruthenium (Ru) in the second solution, and the mixing proportion between the first solution and the second solution do not restrict the manufacture method for the electrode catalyst of this invention. These proportions determine, to some degree, the proportion of the elements in the Fe—Co—Ni particles 26, the proportion of the elements in the Pt—Ru particles 28, the ratio between the two kinds of particles 26, 28 supported on carriers, and the like. Therefore, it suffices that these proportions be set in accordance with the proportion of the elements or of the kinds of particles. Besides, the other numerical values used in the manufacture method for the electrode catalyst particles 22, such as the temperature of the heat treatment, the amount of the carbon powder 24 mixed, etc., do not restrict the invention, but may also be in other ranges.

Furthermore, this embodiment is described above in conjunction with the case where the anode electrode 20 and the cathode electrode 30 have the same construction. However, this invention is not limited so. By using the electrode catalyst particles 22 described above in conjunction with the embodiment in either one of the electrodes, the power generation performance of the alkaline-type fuel cell may be improved to some extent, and a cost reduction of the electrode catalyst may be realized. Besides, particularly since the electrode catalyst particles 22 has the function of breaking C—C bonds, the use of the electrode catalyst particles 22 on the anode electrode 20 side is more effective in the case where a fuel having C—C bonds, such as an alcohol fuel or the like, is used.

In the case where only one of the two electrodes employs the electrode catalyst particles 22, the electrode catalyst that is used in the electrode that does not employ the electrode catalyst of the embodiment may be, for example, an electrode catalyst constructed of iron (Fe), cobalt (Co), nickel (Ni), platinum (Pt), or the like, an electrode catalyst in which any one or more of these metals are supported on a carrier, or an organic metal complex whose center metal is one of those metal atoms, an electrode catalyst in which such an organic metal complex is supported on a carrier, etc. Besides, a diffusion layer constructed of a porous body or the like may also be disposed on a surface of each electrode catalyst.

The embodiment is described above in conjunction with the case where the carbon powder 24 is used as carriers that support the catalyst particles. However, in the invention, the carrier is not limited to the carbon powder. Other particles may also be used as long as the particles may support the catalyst particles 26, 28.

The embodiment is described above in conjunction with the case where the fuel cell is an alkaline fuel cell that employs the anion exchange membrane. However, the invention is not limited to the foregoing type of fuel cell. For example, the fuel cell may also be, for example, an alkaline cell that employs, instead of the anion exchange membrane, an electrolyte membrane that allows permeation of negative ions such as potassium hydroxide (KOH) or the like, or the like. However, in the case where a fuel having carbon (C) is used, the adverse effect of the membrane needs to be taken into consideration.

The embodiment is described above in conjunction with the case where ethanol is used as a fuel. This is because ethanol is available at relatively low cost, and therefore allows cost reduction of the fuel cell. However, in this invention, the fuel is not limited to ethanol. The electrode catalyst particles 22 in the embodiment of the invention may break C—C bonds, and therefore are particularly effective for fuels that have C—C bonds. However, the fuel may also be ammonia or the like. In such a case, too, the electrode catalyst particles 22 may achieve a cost reduction due to the use of the Fe—Co—Ni particles 26, and maintain high catalytic activity due to the use of the Pt—Ru particles 28.

Incidentally, if in the embodiment of the invention, numerical values regarding the number of pieces or the like, the amount, the range, etc., of any of the component elements of the embodiment or the like are referred to, the numerical values are not restrictive, except for the case where a numerical value is particularly explicitly presented, or is specifically determined with theoretical clearness. Besides, the structures, the steps in the method, etc., described with the embodiments are not necessarily essential to the invention, except for the case where a structure, a step, or the like is particularly explicitly presented, or is specifically determined with theoretical clearness.

The invention claimed is:

1. An alkaline fuel cell electrode catalyst comprising two kinds of catalyst particles:
   a first catalyst particle being a Fe—Co—Ni particle, and a second catalyst particle being a Pt—Ru particle, wherein
   each of the first catalyst particle and each of the second catalyst particle are directly supported on a single carrier,
   wherein the carrier is a carbon powder carrier and is composed of particles of 30 nm to 100 nm in particle size.

2. The alkaline fuel cell electrode catalyst according to claim 1, wherein a molar ratio of iron, cobalt and nickel of the first catalyst particle is 1:1:1.

3. The alkaline fuel cell electrode catalyst according to claim 1, wherein a proportion of iron, cobalt and nickel of the first catalyst particle is such that a proportion of each of iron, cobalt and nickel of the first catalyst particle is in a range of 30 mol % to 40 mol % relative to a total amount of the iron, the cobalt and the nickel.

4. The alkaline fuel cell electrode catalyst according to claim 1, wherein a molar ratio of platinum and ruthenium of the second catalyst particle is 1:1.

5. The alkaline fuel cell electrode catalyst according to claim 1, wherein a molar ratio of platinum and ruthenium of the second catalyst particle is in a range of 2:3 to 3:2.

6. The alkaline fuel cell electrode catalyst according to claim 1, wherein a proportion between the first catalyst particle and the second catalyst particle supported on the carrier is within a range of 1:2 to 2:1.

7. An alkaline fuel cell comprising:
   an electrolyte membrane that allows negative ions to pass through the electrolyte membrane; and
   a pair of electrodes disposed on both sides of the electrolyte membrane,
   wherein at least one electrode of the pair of electrodes comprises the alkaline fuel cell electrode catalyst according to claim 1.

8. The alkaline fuel cell according to claim 7, wherein:
   the at least one electrode is an anode electrode; and
   the alkaline fuel cell further comprises a fuel supply system that supplies a fuel having a C—C bond to the anode electrode.

9. A manufacture method for the alkaline fuel cell electrode catalyst of claim 1, comprising:
   preparing a mixed solution by mixing a first solution that contains iron ions, cobalt ions and nickel ions, and a second solution that contains ruthenium ions and platinum ions;
   mixing a carrier particle into the mixed solution;
   vacuum-degassing the mixed solution in which the carrier particle has been mixed;
   separating the carrier particle from the vacuum-degassed mixed solution; and performing a heat treatment on the carrier particle.

10. The manufacture method according to claim 9, wherein the heat treatment of the carrier particle is performed in a vacuum atmosphere.

11. The manufacture method according to claim 9, wherein a molar ratio of the iron ions, the cobalt ions and the nickel ions contained in the first solution is 1:1:1.

12. The manufacture method according to claim 9, wherein a molar ratio of the ruthenium ions and the platinum ions contained in the second solution is 1:1.

13. The manufacture method according to claim 9, wherein a ratio of the first solution and the second solution that are mixed to prepare the mixed solution is in a range of 2:1 to 1:2.

14. The manufacture method according to claim 9, wherein each of a concentration of the iron ions in the first solution, a concentration of the cobalt ions in the first solution and a concentration of the nickel ions in the first solution is in a range of 0.005 [mol/l] to 10 [mol/l].

15. The manufacture method according to claim 9, wherein each of a concentration of the ruthenium ions in the second solution and a concentration of the platinum ions in the second solution is in a range of 0.005 [mol/l] to 10 [mol/l].

16. The manufacture method according to claim 9, wherein a mixed amount of the carrier particle in is in a range of 25 [g] to 100 [g] per liter of the mixed solution prepared by mixing the first solution and the second solution.

17. A manufacture method for an alkaline fuel cell, comprising:
   preparing an electrode catalyst solution by mixing an electrode catalyst for a fuel cell into an electrolyte solution in which an electrolyte membrane that allows permeation of negative ions through the electrolyte membrane has been dissolved; and
   applying the electrode catalyst solution to at least one surface side of the electrolyte membrane that allows permeation of the negative ions,
   wherein the electrode catalyst is manufactured by the manufacture method described in claim 9.

* * * * *